US012646890B2

(12) United States Patent
Lee

(10) Patent No.: US 12,646,890 B2
(45) Date of Patent: Jun. 2, 2026

(54) ELECTRICAL CONNECTOR

(71) Applicant: Hirose Electric Co., Ltd., Yokohama (JP)

(72) Inventor: Yongmun Lee, Yokohama (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 394 days.

(21) Appl. No.: 18/387,744

(22) Filed: Nov. 7, 2023

(65) Prior Publication Data

US 2024/0154364 A1 May 9, 2024

(30) Foreign Application Priority Data

Nov. 9, 2022 (JP) ................................ 2022-179534

(51) Int. Cl.
*H01R 13/641* (2006.01)
*H01R 13/627* (2006.01)

(52) U.S. Cl.
CPC ....... *H01R 13/641* (2013.01); *H01R 13/6272* (2013.01)

(58) Field of Classification Search
CPC .............. H01R 13/641; H01R 13/6272; H01R 13/6271
USPC ......................................... 439/345, 352, 489
See application file for complete search history.

(56) References Cited

U.S. PATENT DOCUMENTS 5,672,073 A * 9/1997 Matsumura ........ H01R 13/7032 439/489
6,109,955 A * 8/2000 Hanazaki ............ H01R 13/641 439/352
6,824,421 B2 * 11/2004 Oka .................. H01R 13/6272 439/489
7,396,253 B2 * 7/2008 Nakamura ........... H01R 13/641 439/352
8,920,187 B2 * 12/2014 Kon ..................... H01R 13/641 439/352
9,022,797 B2 * 5/2015 Kon ..................... H01R 13/641 439/352
2002/0052135 A1 * 5/2002 Noguchi ............. H01R 13/641 439/352
2004/0023547 A1 * 2/2004 Oka .................. H01R 13/6272 439/352

FOREIGN PATENT DOCUMENTS

JP 2022032100 A 2/2022

* cited by examiner

*Primary Examiner* — Gary F Paumen
(74) *Attorney, Agent, or Firm* — Procopio, Cory, Hargreaves & Savitch LLP

(57) ABSTRACT

The engaging portions 34 of the mating detecting member 30 are provided at locations offset upwardly from the pressure-receiving portion 32A of the operating portion 32 and, when the mating detecting member 30 is located in the retracted position, are positioned in a manner that permits locking engagement, from the rear, with sections of the housing 10 other than the locking arm portion 12; and, when pressure is applied from the rear to the pressure-receiving portion 32A of the operating portion 32 of the mating detecting member 30 located in the retracted position, the location of locking engagement of the engaging portions 34 and the housing 10 is used as a fulcrum to displace the front end of the mating detecting member 30 upward and the abutment portion 35 abuts part of the locking arm portion 12 from the rear.

5 Claims, 10 Drawing Sheets

ELECTRICAL CONNECTOR

CROSS-REFERENCE TO RELATED APPLICATIONS

This application claims priority to Japanese Patent Application No. 2022-179534, filed Nov. 9, 2022, the contents of which are incorporated herein by reference in its entirety for all purposes.

BACKGROUND

Technical Field

The present invention relates to an electrical connector having a mating detecting member for detecting a state of being mated with a counterpart connector.

Related Art

Known electrical connectors of this kind include, for example, the one described in Patent Document 1, which is an electrical connector matingly connected to a counterpart connector in a frontal manner. In the electrical connector of said Patent Document 1, a mating detecting member is retained in a housing in a state that permits movement relative to said housing in the forward-backward direction between an advanced position (a primary locking engagement position) and a retracted position (a provisional locking engagement position). Once the electrical connector is matingly connected to a counterpart connector, said mating detecting member is pushed forward and moves toward the advanced position. Then, based on the fact that the mating detecting member has moved to the advanced position, it is detected that the electrical connector has been properly matingly connected to the counterpart connector.

The housing has locking arms that extend toward the rear and are resiliently displaceable in the vertical direction. When the connectors are in the mated state, said locking arms are capable of engaging and locking with a counterpart housing using locking portions provided at their rear ends. The mating detecting member has detecting locking arms that extend toward the front and are resiliently displaceable in the vertical direction. The detecting locking arms have engaging portions capable of lockingly engaging, from the rear, the locking portions of the locking arms in their free state when the mating detecting member is located in the retracted position.

PATENT DOCUMENTS

[Patent Document 1]
Japanese Patent Application Publication No. 2022-032100.

SUMMARY

Problems to be Solved

Due to the fact that, in said Patent Document 1, the detecting locking arms are located in the retracted position in the unmated state of the connectors, in which no mating connection to a counterpart connector is in effect, for example, such as when the electrical connector is not in use, etc., even if a forwardly directed external force were to act on the mating detecting member, the engaging portions of the detecting locking arms will abut and engage, from the rear, the locking portions of the locking arms of the housing in their free state, thereby preventing movement of the mating detecting member toward the advanced position.

However, in the event that, with the connectors in an unmated state, the locking arm portions of the housing are placed in a resiliently displaced state as a result of being inadvertently subjected to an exterior force, the mating detecting member will end up moving to the advanced position should a forwardly directed external force act on the mating detecting member, because the engaging portions of the detecting locking arms are not lockingly engaged with the locking portions of the detecting locking arms. If the mating detecting member should end up moving to the advanced position in the unmated state of the connectors, a procedure involving temporarily returning the mating detecting member located in the advanced position back to the retracted position will have to be performed thereafter when matingly connecting the electrical connector to the counterpart connector. Consequently, additional time and effort will be needed when performing the procedure of electrical connector mating and, as a result, work efficiency will decrease.

With these considerations in mind, it is an object of the present invention to provide an electrical connector in which movement of the mating detecting member toward the advanced position in the unmated state of the electrical connectors can be adequately prevented.

Technical Solution (1) The inventive electrical connector, which is an electrical connector matingly connected to a counterpart connector in a frontal manner, has a housing, a plurality of terminals arranged side by side in the connector width direction and retained within the housing, and a mating detecting member which is retained in the housing in a state that permits movement relative to the housing in the forward-backward direction between an advanced position and a retracted position and which is used to detect a state of being mated with a counterpart connector.

In such an electrical connector according to the present invention, the housing has a locking arm portion which extends in the forward-backward direction and is resiliently displaceable in the vertical direction, and which is lockingly engageable with a counterpart connector in the forward-backward direction; the mating detecting member has an operating portion provided in the rear portion of the mating detecting member, resilient arm portions which extend in the forward-backward direction along the locking arm portion and are resiliently displaceable in the vertical direction, engaging portions protruding in the connector width direction from the rear portions of the resilient arm portions, and an abutment portion formed at the front end of the mating detecting member below the locking arm portion; the operating portion, in its rear end portion, has a pressure-receiving portion intended for receiving pressing operations from the rear; the engaging portions are provided at locations offset upwardly from the pressure-receiving portion and, when the mating detecting member is located in the retracted position, are positioned in a manner that permits locking engagement, from the rear, with sections of the housing other than the locking arm portion; and, when pressure is applied from the rear to the pressure-receiving portion of the operating portion of the mating detecting member located in the retracted position, the location of locking engagement of the engaging portions and the housing is used as a fulcrum to displace the front end of the mating detecting member upward and abut said abutment portion against part of the locking arm portion from the rear.

In the present invention, the engaging portions provided in the mating detecting member are positioned in a manner that permits locking engagement from the rear with sections of the housing other than the locking arm portion. Namely, the sections lockingly engageable by the engaging portions from the rear are immovable sections that are never resiliently displaced within the housing. Therefore, when the mating detecting member is pushed forward in the unmated state of the connectors, the engaging portions of the mating detecting member lockingly engage the housing from the rear in a reliable manner and, since this state is maintained, movement of the mating detecting member toward the advanced position is adequately prevented.

Further, in the mating detecting member according to the present invention, the engaging portions are provided at locations offset upwardly from the pressure-receiving portion intended for receiving pressing operations from the rear. Therefore, when the engaging portions lockingly engage the housing from the rear, the location of locking engagement of the engaging portions and the housing is used as a fulcrum to displace the front end of the mating detecting member upward. In addition, in the present invention, the abutment portion formed at the front end of the mating detecting member abuts part of the locking arm portion from the rear. That is to say, forward movement of the mating detecting member is prevented in a more reliable manner because not only is the aforementioned housing lockingly engaged with the aforementioned engaging portions, but the aforementioned abutment portion and the aforementioned part of the locking arm portion are also in abutment.

(2) In the invention of (1), part of the locking arm portion may be formed as a stepped portion.

(3) In the inventions of (1) or (2), the locking arm portion may be adapted to be resiliently displaced downward as a result of abutment against the counterpart connector and the operating portion may be placed in a state that permits abutment against the locking arm portion from the rear when the electrical connector is partially mated with the counterpart connector. When such an arrangement is adopted, pushing the operating portion of the mating detecting member forward in the partially mated state of the connectors causes said operating portion to abut the locking arm portion from the rear and apply pressure to said locking arm portion, thereby making it possible to move the housing forward simultaneously with the forward movement of the mating detecting member. Therefore, just by performing a single operation of pushing the operating portion of the mating detecting member forward, the mating detecting member can be moved to the advanced position while matingly connecting the housing to the counterpart connector. As a result, the work efficiency of the operation of connector mating is improved.

(4) In the invention of (3), the operating portion may be placed in a state that permits abutment, from the rear, against the rear end face of the resiliently downwardly displaced locking arm portion with the front end face of the operating portion.

(5) In the inventions of (2) to (4), the stepped portion may be formed over the entire extent of the locking arm portion in the connector width direction, and the abutment portion may be formed within a range corresponding to the entire extent of the locking arm portion in the connector width direction. Adopting such an arrangement makes it possible to reliably prevent forward movement of the mating detecting member in the unmated state of the connectors because the surface area of the abutment of the abutment portion against the stepped portion is increased. In addition, since the abutment force is distributed in proportion to the size of the surface area of the abutment, the load applied to the aforementioned stepped portion and the aforementioned abutment portion is reduced and damage to said stepped portion and said abutment portion can be adequately avoided.

Technical Effect

The present invention can provide an electrical connector in which movement of the mating detecting member toward the advanced position in the unmated state of the electrical connectors can be adequately prevented.

DETAILED DESCRIPTION

Embodiments of the present invention will be described hereinbelow with reference to the accompanying drawings.

Figure 1:
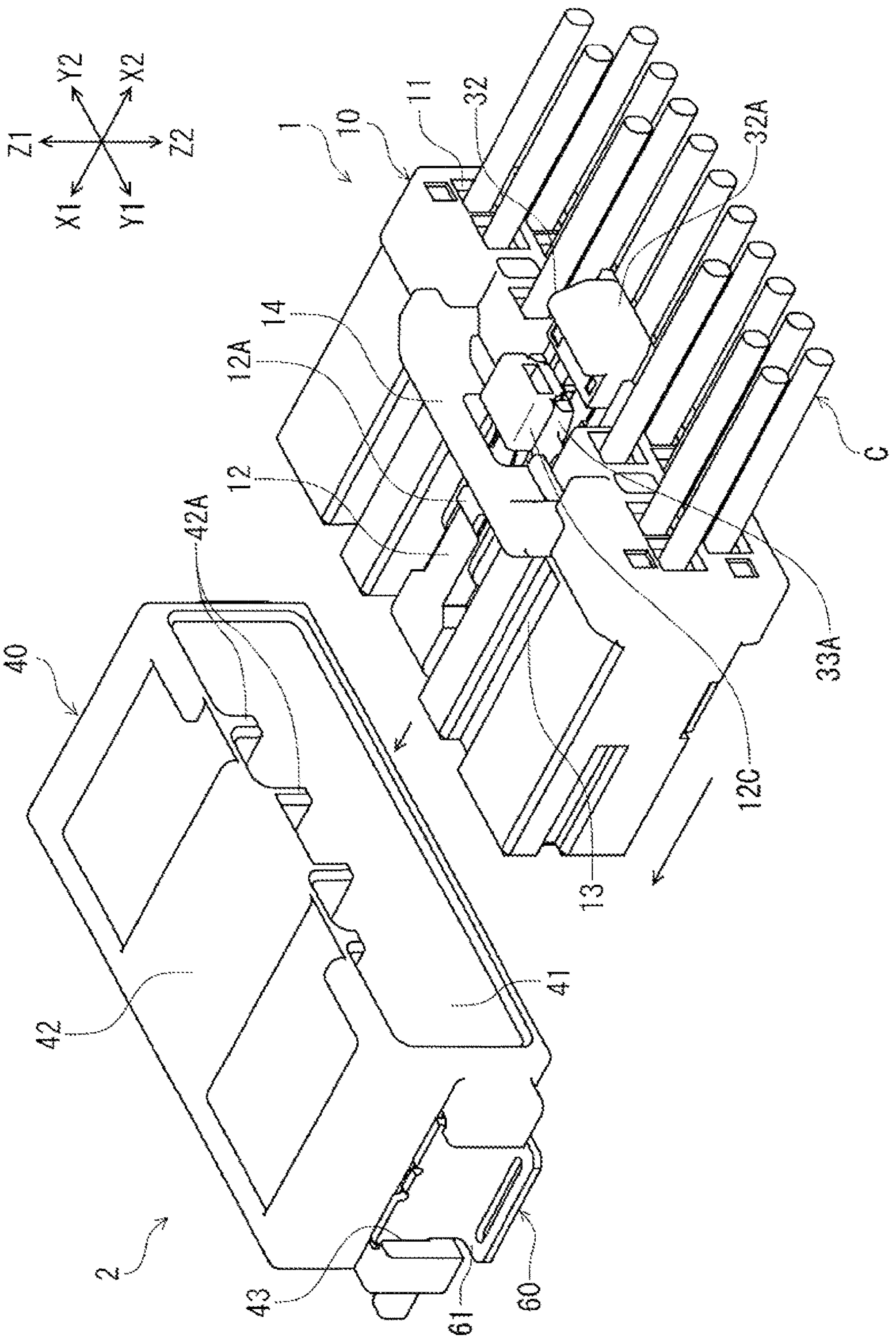
FIG. 1 is a perspective view illustrating an electrical connector according to an embodiment of the present invention along with a counterpart connector, shown in a state prior to connector mating.
Figure 2:
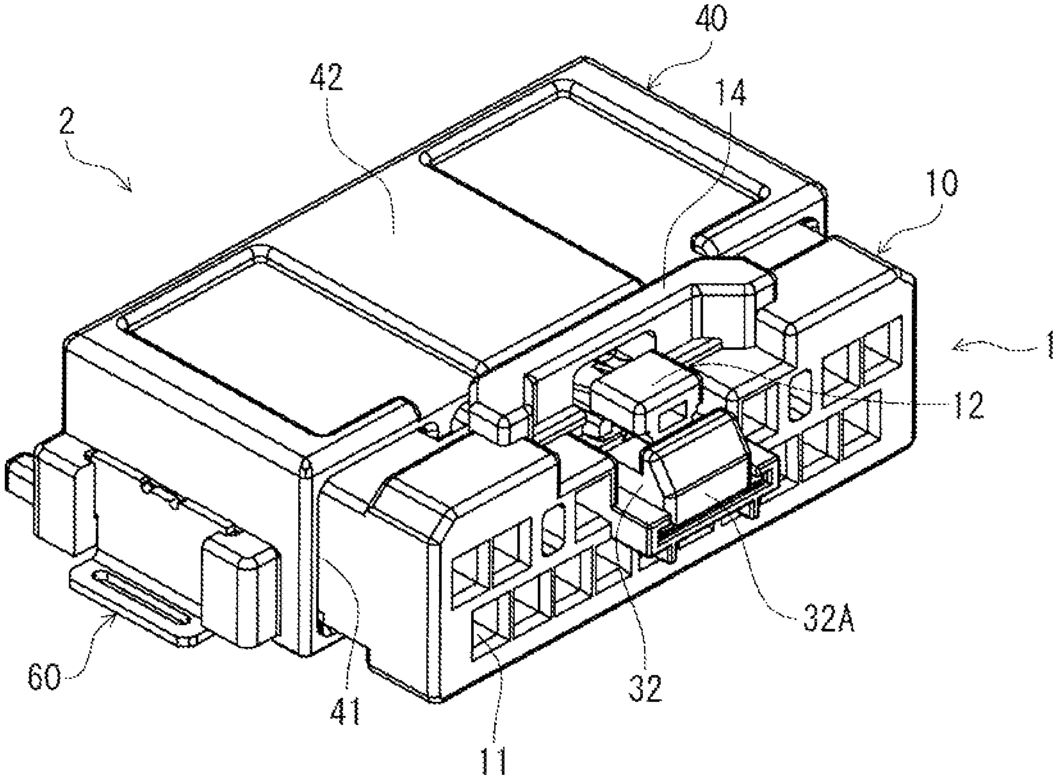
FIG. 2 is a perspective view illustrating the electrical connector of FIG. 1 along with the counterpart connector, shown in a state after connector mating.
Figure 3:
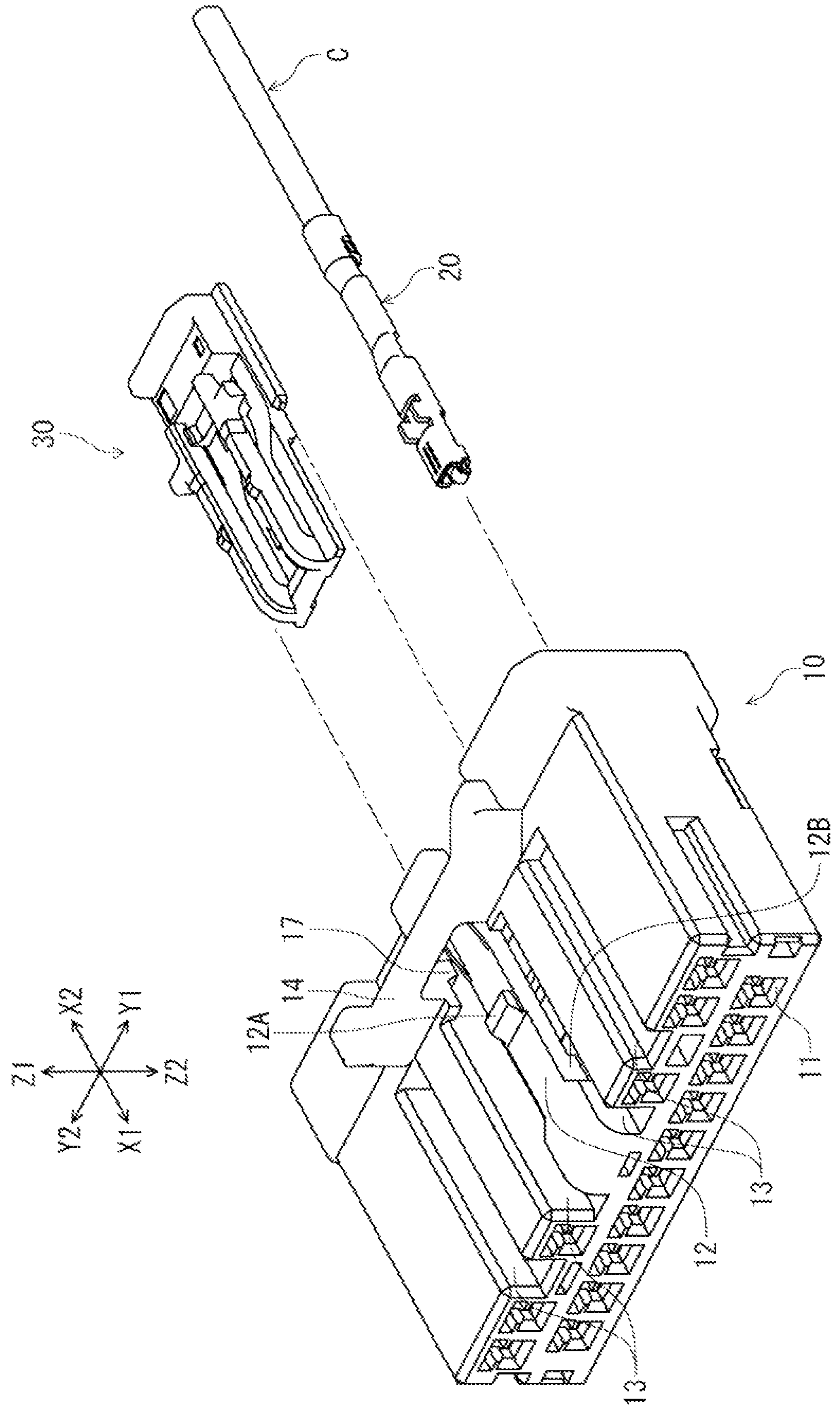
FIG. 3 is a perspective view illustrating the components of the electrical connector of FIG. 1 in an exploded state.
Figure 4:
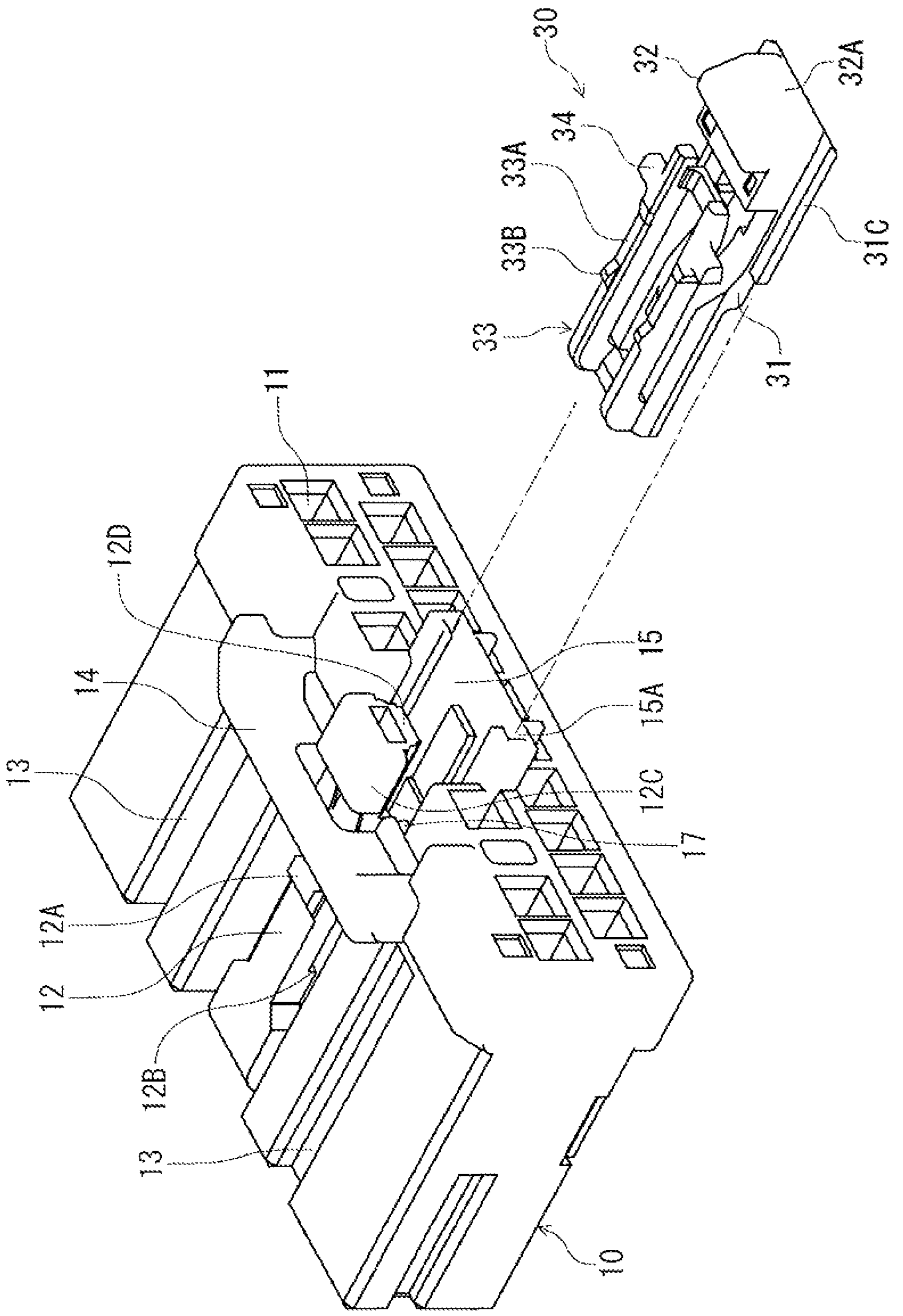
FIG. 4 is a perspective view illustrating the housing and the mating detecting member in an isolated state.

FIG. 1 and FIG. 2 are perspective views illustrating the electrical connector 1 of the present embodiment (hereinafter referred to as "connector 1") along with a counterpart connector 2, shown in a state prior to connector mating in FIG. 1, and subsequent to connector mating in FIG. 2. FIG. 3 is a perspective view illustrating the components of the connector 1 in an exploded state. FIG. 4 is perspective view illustrating the housing 10 and the mating detecting member 30 in an isolated state. It should be noted that illustration of the cables is omitted in FIG. 2. In addition, only one terminal equipped with a cable is illustrated in FIG. 3, and illustration of other terminals equipped with cables is omitted.

The connector 1, which is an electrical connector for cables that retains a plurality of terminals 20 having cables C connected thereto that extend in the forward-backward direction (X-axis direction), is matingly connected to a counterpart connector 2 in a frontal manner (on the X1 side). The counterpart connector 2 is an electrical connector for circuit boards mounted on a mounting face of a circuit board (not shown). In the present embodiment, the X1 direction of the X-axis direction (forward-backward direction) is "forward," and the X2 direction is "backward." In addition, the Y-axis direction, which is at right angles to the forward-backward direction (X-axis direction) in a plane (the XY plane) parallel to the mounting face of the circuit board, is the connector width direction, and the Z-axis direction, which is normal to the mounting face of the circuit board, is the vertical direction (with the Z1 direction being "up," and the Z2 direction being "down").

Figure 9:
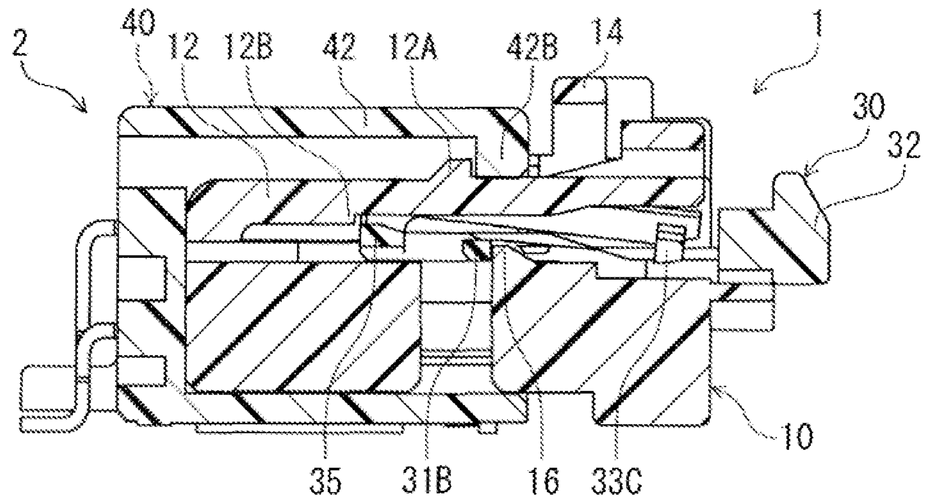
FIGS. 9 (A) to 9 (C) illustrate a longitudinal cross-sectional view of the electrical connector and the counterpart connector, with the mating detecting member located in the retracted position after connector mating, wherein FIG. 9 (A) shows a cross section at the location of the locking portion, FIG. 9 (B) shows a cross section at the location of an engaging portion, and (C) shows a cross section at the location of a protrusion.
Figure 9:
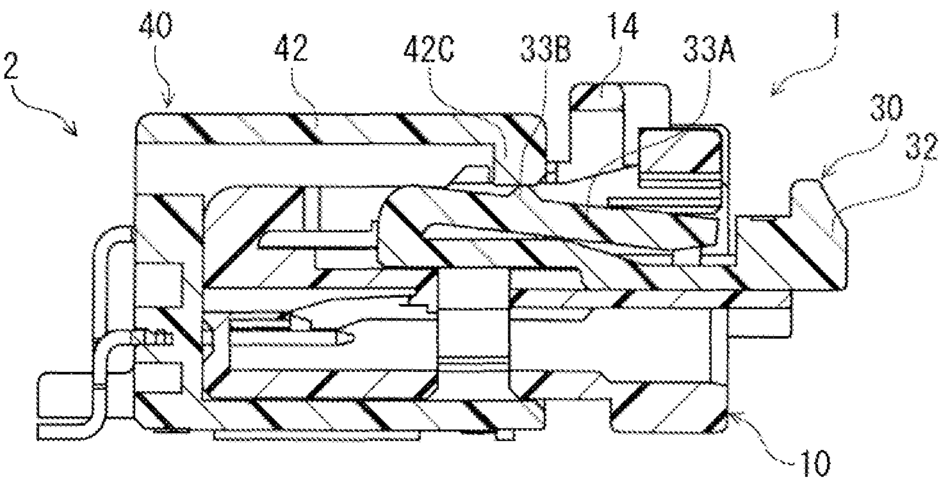
Figure 9:
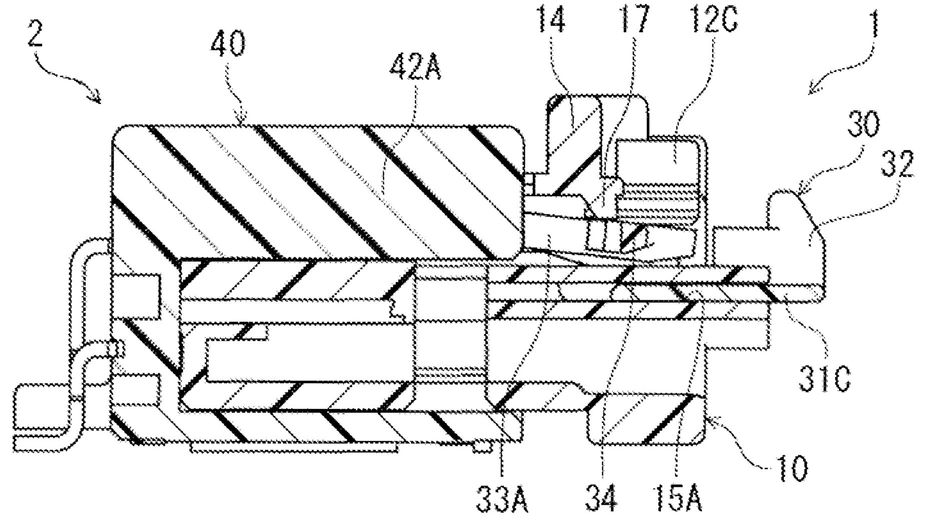
Figure 10:
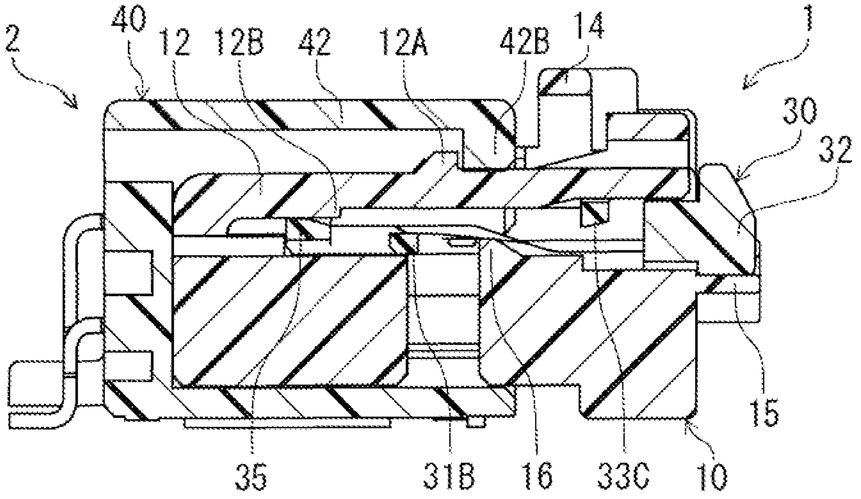
FIGS. 10 (A) to 10 (C) illustrate a longitudinal cross-sectional view of the electrical connector and the counterpart connector, with the mating detecting member moved to the advanced position after connector mating, wherein FIG. 10 (A) shows a cross section at the location of the locking portion, FIG. 10 (B) shows a cross section at the location of an engaging portion, and FIG. 10 (C) shows a cross section at the location of a protrusion.
Figure 10:
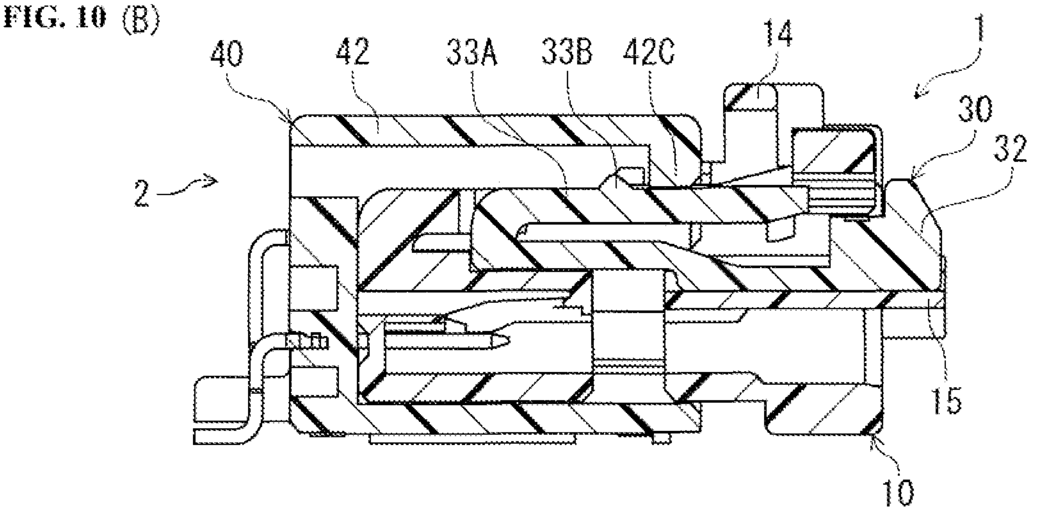
Figure 10:
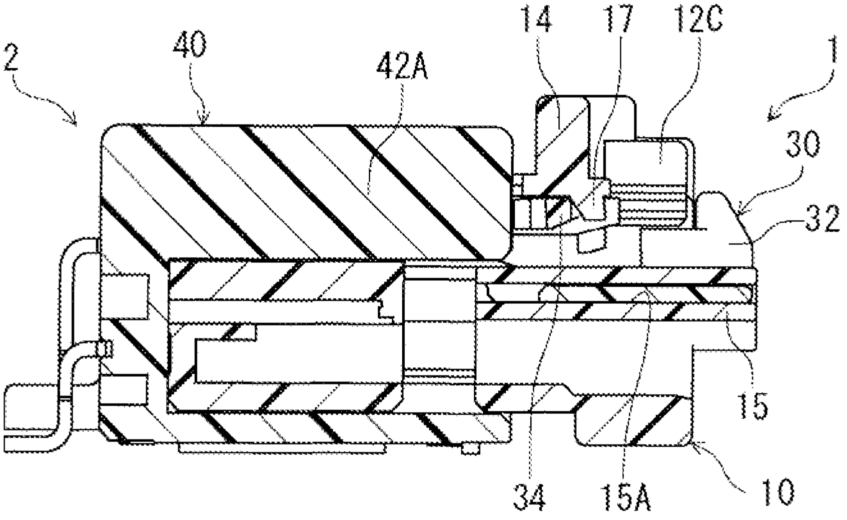

The connector 1 has a housing 10, a plurality of terminals 20 arranged and retained within the housing 10 such that the terminal array direction is the connector width direction, and a mating detecting member 30 retained in the housing 10 in a state that permits movement relative to the housing 10 in the forward-backward direction between an advanced position (see FIGS. 10 (A) to 10 (C)) and a retracted position (see FIGS. 9 (A) to 9 (C)).

The housing 10, which is made of plastics or other electrically insulating materials, has a generally rectangular parallelepiped-like exterior configuration whose longitudinal direction is the connector width direction. As shown in FIG. 3, an array of terminal accommodating portions 11 used to accommodate and retain the terminals 20 are formed in the housing 10 in the terminal array direction. In addition, as shown in FIG. 3, the terminal accommodating portions 11 have two tiers in the vertical direction. The terminal accommodating portions 11, which extend through the housing 10 in the forward-backward direction, are adapted to receive, accommodate, and retain the terminals 20, which are connected to the cables C, from the rear.

A locking arm portion 12, which is resiliently displaceable in the vertical direction, is provided on the top face of the housing 10 at an intermediate location in the connector width direction. The locking arm portion 12 has a cantilevered configuration extending toward the rear from the top face of the front end of the housing 10 to the location of the rear end of the housing 10. A locking portion 12A, which is used for locking to the counterpart connector 2, is provided protruding from the top face of the locking arm portion 12 at an intermediate location of the locking arm portion 12 in the forward-backward direction. The locking portion 12A has a front end face, which is an inclined surface sloping downward as one moves forward, and a rear end face, which is a surface normal to the forward-backward direction (see FIG. 6 (A)).

Figure 6:
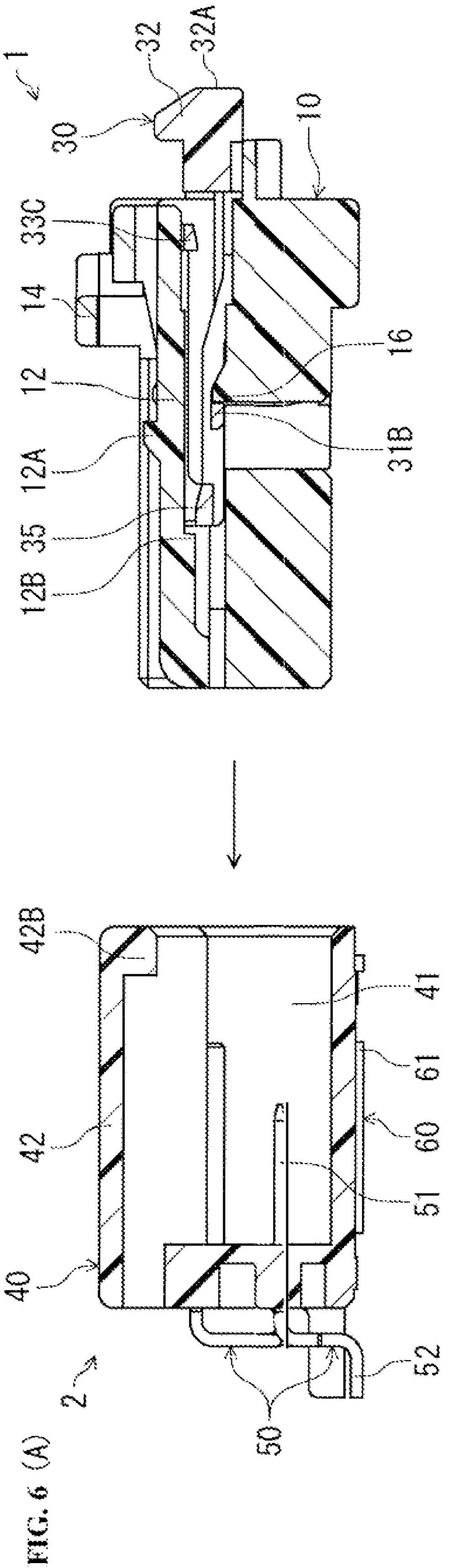
FIGS. 6 (A) and 6 (B) is a longitudinal cross-sectional view of the electrical connector and the counterpart connector in a state prior to connector mating, wherein FIG. 6 (A) shows a cross section at the location of the locking portion, and FIG. 6 (B) shows a cross section at the location of a protrusion.
Figure 6:
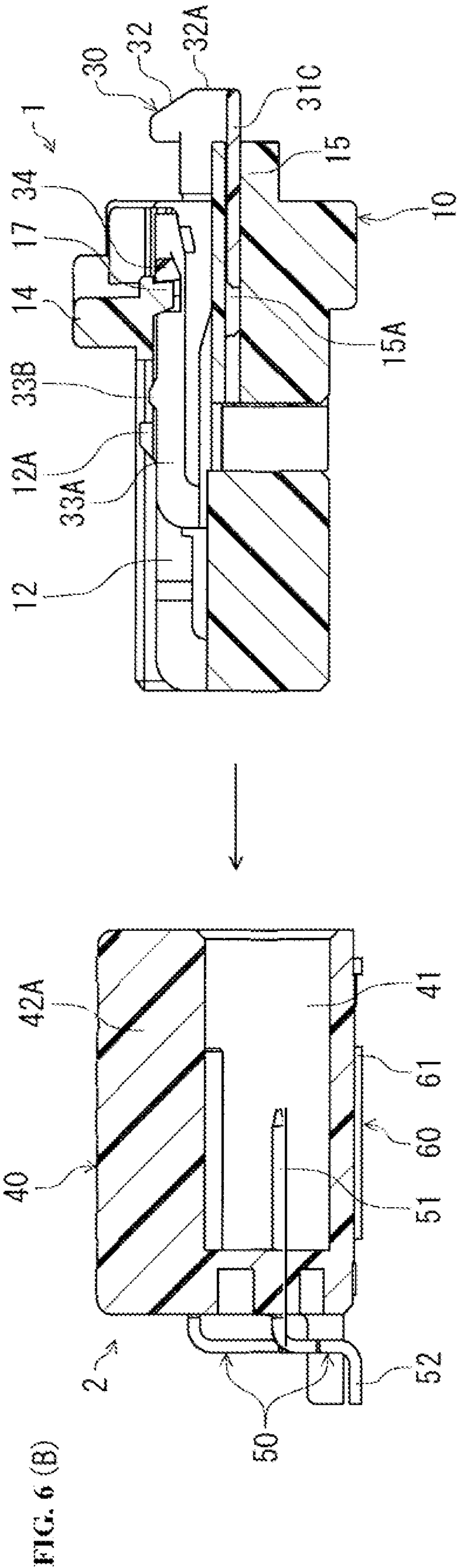

As shown in FIGS. 3 and 4, a stepped portion 12B is formed on the bottom face of the front end portion of the locking arm portion 12 (see also FIG. 6 (A), etc.). The stepped portion 12B, which is formed over the entire extent of the locking arm portion 12 in the connector width direction, protrudes downward at a location forward of the front end of the mating detecting member 30 located in the retracted position (see also FIG. 6 (A), etc.). In addition, the stepped portion 12B is provided forwardly of the locking portion 12A.

As shown in FIGS. 1 and 4, the opposite ends of the rear end portion of the locking arm portion 12 in the connector width direction in the top portion thereof protrude outwardly in the connector width direction. This protruding section, which is located directly above the rear end portions of the hereinafter-described resilient arm portions 33A of the mating detecting member 30, is formed as a pressure-applying portion 12C capable of applying downward pressure to the rear end portions of the resilient arm portions 33A.

A plurality of guiding groove portions 13 are formed in the top face of the housing 10 on the opposite sides of the locking arm portion 12 in the connector width direction. The guiding groove portions 13, i.e., sections intended for guidance by the hereinafter-described guiding protrusions 42A of the counterpart connector 2 during insertion into and removal from the counterpart connector 2, are formed extending in the forward-backward direction. A restricting portion 14 that extends above the locking arm portion 12 in a manner to straddle the locking arm portion 12 in the connector width direction is provided on the top face of the rear portion of the housing 10. The restricting portion 14 is adapted to restrict upward displacement of the locking arm portion 12 in excess of a predetermined amount.

As shown in FIG. 4, a supporting portion 15 used to support the mating detecting member 30 is formed on the top face of the housing 10 located directly below the locking arm portion 12. As shown in FIG. 4, the rear end portion of the supporting portion 15 protrudes from the rear end face of the housing 10. The supporting portion 15 has guiding groove portions 15A used for guiding the mating detecting member 30 that are formed extending in the forward-backward direction at the opposite ends thereof in the connector width direction.

In addition, a disengagement-preventing protrusion 16 used to prevent inadvertent rearward disengagement of the mating detecting member 30 from the housing 10 (see FIG. 6 (A), etc.) is provided protruding upward at an intermediate location in the forward-backward direction on the top face of the housing 10 located directly below the locking arm portion 12. Further, as shown in FIGS. 3 and 4, engageable portions 17 are formed in the rear portion of the housing 10 so as to be located on the opposite sides of the rear portion of the locking arm portion 12 in the connector width direction in a manner to sandwich the rear portion of the locking arm portion 12 (see also FIG. 6 (B), etc.). The engageable portions 17 are located forwardly of the rear end of the housing 10 and protrude from the interior wall surface of the space accommodating the locking arm portion 12 into said space.

As shown in FIG. 3, the terminals 20, which are formed by bending a sheet metal member in the through-thickness direction, are shaped to extend in the forward-backward direction and are connected by their rear portions to the front end portions of the cables C. The terminals 20, whose front end portions have a box-like configuration, receive male type counterpart terminals 50 provided in the counterpart connector 2 (see FIG. 6 (A)) from the front and are enabled to contact said counterpart terminals 50 with resiliently displaceable contact portions (not shown). That is to say, the terminals 20 are female type terminals.

Figure 5:
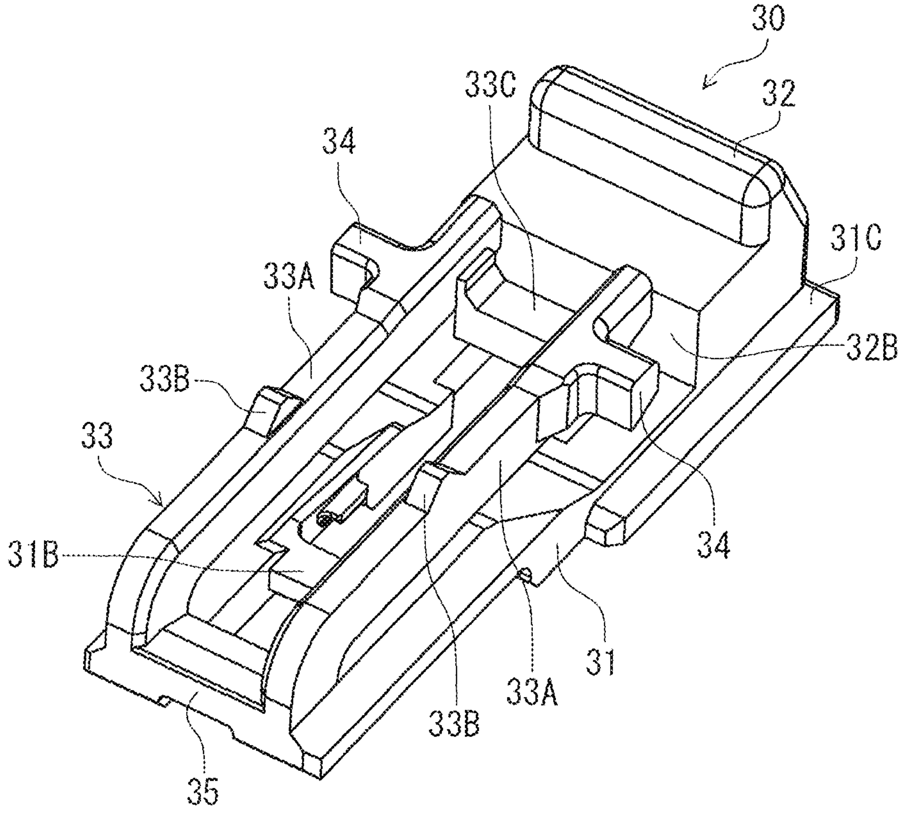
FIGS. 5 (A) and 5 (B) is a perspective view of the mating detecting member, shown as viewed from above in FIG. 5 (A), and as viewed from below in FIG. 5 (B).
Figure 5:
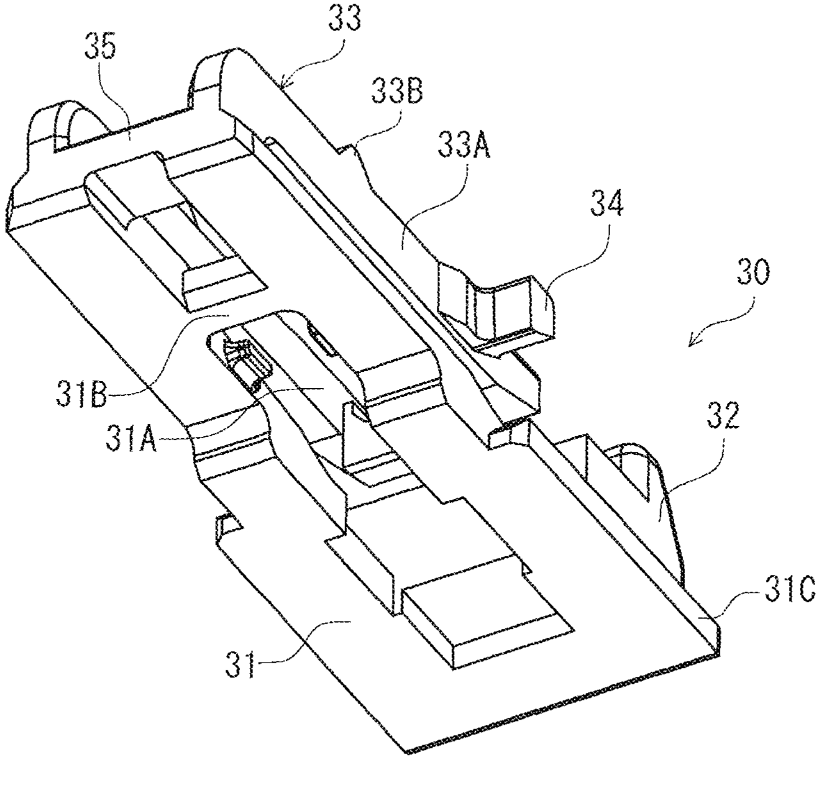

FIGS. 5 (A) and 5 (B) illustrates a perspective view of the mating detecting member 30, shown as viewed from above in FIG. 5 (A) and as viewed from below in FIG. 5 (B). The mating detecting member 30 has a base portion 31, which is made of plastics or other electrically insulating materials and whose major faces are normal to the vertical direction, an operating portion 32 provided in the rear portion of the base portion 31, resilient portions 33 which extend toward the rear from the front end of the base portion 31 and are resiliently displaceable in the vertical direction, engaging portions 34 protruding outwardly in the connector width direction from the rear portions of the resilient portions 33, and an abutment portion 35 formed at the front end of the mating detecting member 30.

The base portion 31 has a plate-like configuration having a generally rectangular parallelepiped-like external shape whose longitudinal direction is the forward-backward direction. As shown in FIG. 5 (B), the base portion 31 has formed therein an aperture portion 31A that extends in the forward-backward direction in the central area in the connector width direction while being disposed therethrough in the vertical direction. The opposite side edges of said aperture portion 31A (edge portions extending in the forward-backward direction) are coupled by a front coupling portion 31B extending in the connector width direction at a location proximate to the front end. Guided plate portions 31C guided by the guiding groove portions 15A of the housing 10 are formed at the opposite side edges of the rear portion of the base portion 31.

The operating portion 32 is provided protruding from the top face of the rear end portion of the base portion 31. In its rear end portion (which is a section having a rear end face normal to the forward-backward direction), the operating portion 32 has a pressure-receiving portion 32A intended for receiving pressing operations from the rear. The resilient portions 33 have resilient arm portions 33A at two locations spaced apart in the connector width direction or, more specifically, at two locations on the opposite external sides of the locking arm portion 12 of the housing 10. That is to say, the spacing between the two resilient arm portions 33A is slightly larger than the width dimensions of the locking arm portion 12.

The two resilient arm portions 33A have a cantilevered configuration extending toward the rear from the top face of the front end of the base portion 31 to a location slightly forward of the operating portion 32. Protrusions 33B capable of lockingly engaging the counterpart connector 2 are provided protruding from the top faces of the resilient arm portions 33A at intermediate locations of the resilient arm portions 33A in the forward-backward direction. When viewed in the connector width direction, the protrusions 33B protrude in a generally triangular configuration. That is to say, the protrusions 33B have front end faces that constitute inclined surfaces sloping downward as one moves forward, and rear end faces that constitute inclined surfaces sloping downward as one moves rearward (see FIG. 6 (B)).

The rear end portions of the two resilient arm portions 33A are coupled by a rear coupling portion 33C extending in the connector width direction. In addition, as shown in FIG. 1, the rear end portions of the resilient arm portions 33A are located directly below the pressure-applying portion 12C of the locking arm portion 12 within a range overlapping with said pressure-applying portion 12C in the connector width direction. Therefore, the rear end portions of the resilient arm portions 33A are adapted to receive a downwardly directed pressure force exerted by the pressure-applying portion 12C when the locking arm portion 12 is resiliently displaced downward.

The engaging portions 34 protrude outwardly in the connector width direction from the rear portion of each resilient arm portion 33A. As shown in FIG. 6 (B), when the resilient arm portions 33A are in their free state, the engaging portions 34 are positioned facing the engageable portions 17 of the housing 10 from the rear. In addition, as shown in FIG. 6 (B), when the resilient arm portions 33A are in their free state, the engaging portions 34 are provided at locations offset upwardly from the pressure-receiving portion 32A. As used herein, the phrase "locations offset upwardly" refers to locations upward of the vertically central location of the pressure-receiving portion 32A. Therefore, this includes not only cases in which the engaging portions 34 are located upwardly of the pressure-receiving portion 32A as illustrated in FIG. 6 (B), but also cases in which the engaging portions 34 are located in an overlapping relationship with the top half of the pressure-receiving portion 32A in the vertical direction.

As shown in FIG. 5 (A), the abutment portion 35 couples the front end portions of the two resilient arm portions 33A while protruding from the top face of the front end portion of the base portion 31 at a location between the two resilient arm portions 33A in the connector width direction. The front end face of the abutment portion 35 constitutes a flat surface normal to the forward-backward direction.

The mating detecting member 30 is attached to the housing 10 by insertion from the rear. Specifically, the front portion of the base portion 31 is inserted from the rear into the space between the top face of the housing 10 and the locking arm portion 12 and, furthermore, the guided plate portions 31C of the base portion 31 are inserted from the rear into the guiding groove portions 15A of the housing 10. In this manner, the guided plate portions 31C of the mating detecting member 30 are guided forward by the guiding groove portions 15A. Since in the present embodiment the two resilient arm portions 33A are located on the opposite external sides of the locking arm portion 12 of the housing 10 in the connector width direction, when the mating detecting member 30 is moved forward, the locking arm portion 12 enters between the two resilient arm portions 33A from the front. Further, at the moment when, upon clearing the disengagement-preventing protrusion 16, the front coupling portion 31B of the mating detecting member 30 is brought in front of said disengagement-preventing protrusion 16 and is enabled to lockingly engage said disengagement-preventing protrusion 16 from the front, the attachment of the mating detecting member 30 is complete (see FIGS. 6 (A) and 6 (B)).

At such time, the mating detecting member 30, which is disposed in the retracted position, is prevented from rearwardly disengaging from the housing 10 by the locking engagement of the front coupling portion 31B with the disengagement-preventing protrusion 16 from the front. In addition, in this retracted position, the engaging portions 34 of the mating detecting member 30, located slightly to the rear of the engageable portions 17 of the housing 10, face the engageable portions 17 from the rear. Therefore, even if a forwardly directed external force inadvertently acts on the mating detecting member 30, forward movement of the mating detecting member 30 will be restricted by the locking engagement of the engaging portions 34 with the engageable portions 17 from the rear.

As shown in FIG. 1, the counterpart connector 2 has a counterpart housing 40, a plurality of counterpart terminals 50 (see FIGS. 6 (A) and 6 (B)) arranged and retained within the counterpart housing 40 such that the terminal array direction is the connector width direction, and anchor fittings 60 retained at the opposite ends of the counterpart housing 40 in the connector width direction.

The counterpart housing 40, which is made of plastics or other electrically insulating materials, has a generally rectangular parallelepiped-like exterior configuration whose longitudinal direction is the connector width direction. A rearwardly open receiving portion 41 capable of receiving the connector 1 is formed in the counterpart housing 40. Guiding protrusions 42A are formed on the top wall 42 of the counterpart housing 40 at locations corresponding to the guiding groove portions 13 of the connector 1 in the connector width direction. The guiding protrusions 42A form ridges that extend in the forward-backward direction while protruding downwardly from the bottom face of the top wall 42. The guiding protrusions 42A are adapted to enter the guiding groove portions 13 of the connector 1 from the front and guide the connector 1 forward during connector mating.

The rear end portion of the top wall 42 protrudes downwardly at least at locations corresponding to the locking portion 12A and protrusions 33B of the connector 1 in the connector width direction. In the present embodiment, a protruding section at a location corresponding to the locking portion 12A is formed as a lockable portion 42B lockingly engageable with the locking portion 12A (see FIG. 10 (A), etc.) and, in addition, a protruding section at a location corresponding to the protrusions 33B is formed as a projecting edge portion 42C lockingly engageable with the protrusions 33B (see FIG. 10 (B), etc.).

The counterpart terminals 50, which are formed by bending metal strips, are retained in the counterpart housing 40 while being arranged in alignment with the terminals 20 of the connector 1. As shown in FIGS. 6 (A) and 6 (B), the rear end portions of the counterpart terminals 50, which are located within the receiving portion 41, are formed as contact portions 51 capable of making contact with the terminals 20 of the connector 1. In addition, the front end portions of the counterpart terminals 50, which are located forwardly of the counterpart housing 40, are formed as connection portions 52 solder-connectable to the corresponding circuits of the circuit board (not shown).

As shown in FIG. 1, the anchor fittings 60, which are formed by bending sheet metal members in the through-thickness direction, are press-fitted from below and retained within fitting-retaining groove portions 43 formed at the opposite ends of the counterpart housing 40. The anchor fittings 60, which have anchoring portions 61 extending outwardly in the connector width direction in the bottom portion thereof, are adapted to be secured by solder connection to the corresponding portions of the circuit board (not shown) with said anchoring portions 61.

Figure 7:
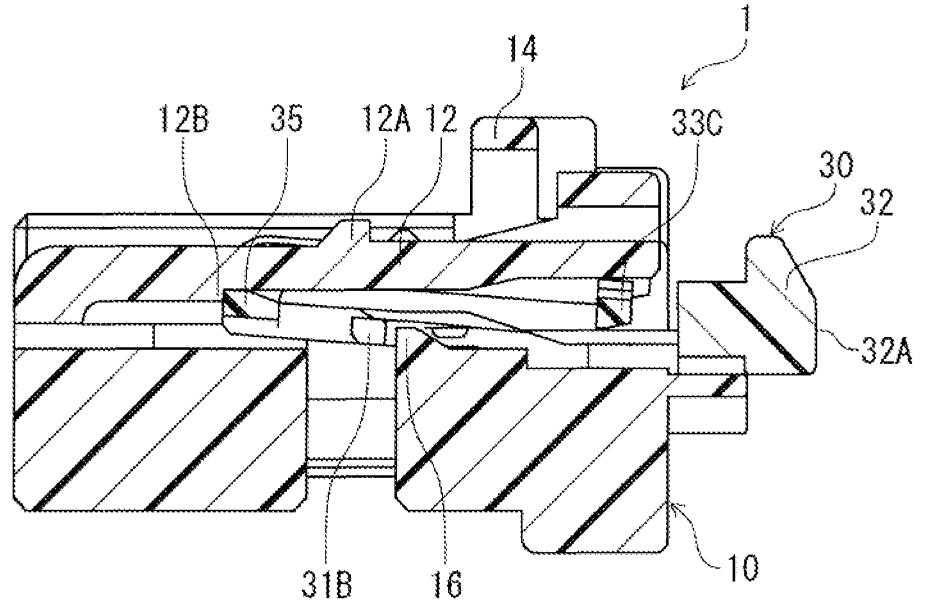
FIGS. 7 (A) and 7 (B) illustrates a longitudinal cross-sectional view of the electrical connector in the unmated state of the connectors, with the mating detecting member pushed in, wherein FIG. 7 (A) shows a cross section at the location of the locking portion, and FIG. 7 (B) shows a cross section at the location of a protrusion.
Figure 7:
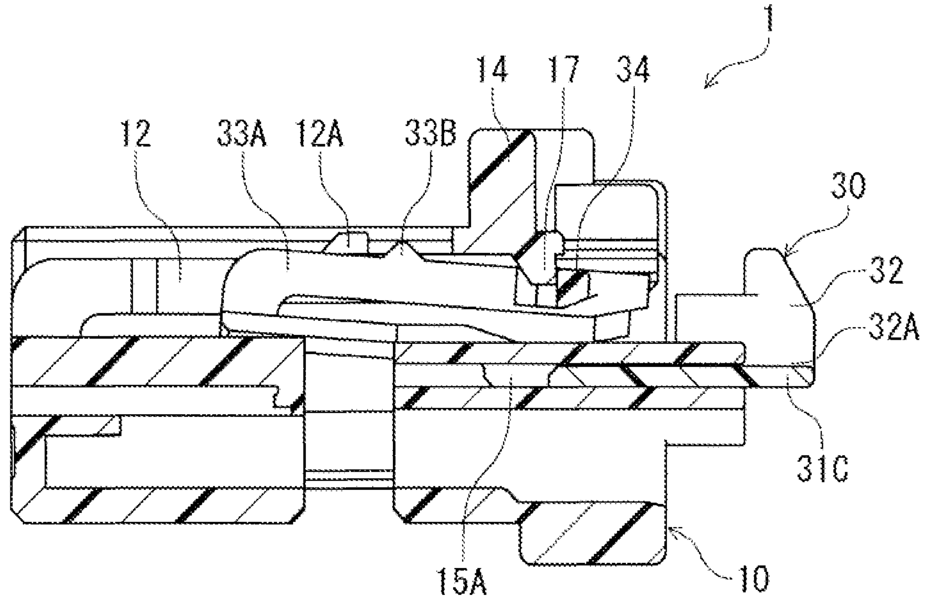

The operation of matingly connecting the connector 1 and the counterpart connector 2 will now be described with reference to FIGS. 6 to 10. First, as shown in FIGS. 6 (A) and 6 (B), prior to initiating the operation of mating connection, the mating detecting member 30 of the connector 1 is pre-positioned in the retracted position. When a forwardly-pushing external force inadvertently acts on the mating detecting member 30 located in the retracted position in a state before the initiation of the operation of mating connection to the counterpart connector 2, i.e., in the unmated state of the connectors, forward movement of the mating detecting member 30 is prevented because, as shown in FIG. 7 (B), the engaging portions 34 lockingly engage the engageable portions 17 of the housing 10 from the rear. In the present embodiment, the engageable portions 17 are formed in parts of the housing 10 different from the locking arm portion 12, i.e., in immovable sections not subject to resilient displacement. Therefore, the engaging portions 34 of the mating detecting member 30 lockingly engage the engageable portions 17 in a reliable manner and, since this state is maintained, movement of the mating detecting member 30 toward the advanced position is adequately prevented.

In addition, in the present embodiment, the engaging portions 34 of the mating detecting member 30 are provided at locations offset upwardly from the pressure-receiving portion 32A of the operating portion 32. Therefore, as shown in FIG. 7 (B), when the engaging portions 34 lockingly engage the engageable portions 17 from the rear, the location of locking engagement of the engaging portions 34 and the engageable portions 17 is used as a fulcrum to displace the front end of the mating detecting member and lift it up. As a result, as shown in FIG. 7 (A), the abutment portion 35 of the mating detecting member 30 abuts the stepped portion 12B of the locking arm portion 12 from the rear. This means that in the present embodiment, not only are the engaging portions 34 and the engageable portions 17 lockingly engaged, but the abutment portion 35 and the stepped portion 12B are in abutment as well, thereby preventing forward movement of the mating detecting member 30 in a more reliable manner. In addition, in the present embodiment, as shown in FIG. 7 (A), when the front end of the mating detecting member is displaced upward, the abutment portion 35 also abuts the locking arm portion 12 from below.

In this manner, in the present embodiment, even if a forwardly directed external force inadvertently acts on the mating detecting member 30 located in the retracted position in the unmated state of the connectors, forward movement of the mating detecting member 30 will be adequately prevented. Therefore, the procedure of returning the mating detecting member already moved to the advanced position back to the retracted position, as in the prior art, becomes unnecessary because the mating detecting member 30 will reliably be in the retracted position when the operation of mating connection of the connector 1 and the counterpart connector 2 is initiated, and the work efficiency of the operation of mating connection of the connectors can be increased.

Although in the present embodiment the abutment portion 35 of the mating detecting member 30 is provided at a location where the front end face thereof forms part of the front end face of the mating detecting member 30, it is not essential to provide the abutment portion in such a location and the abutment portion may be provided, for example, at a location slightly to the rear of the front end face of the mating detecting member. In other words, it should be sufficient to provide the abutment portion at the front end of the mating detecting member, so long as it is adapted to abut part of the locking arm portion from the rear when the front end of the mating detecting member is displaced upward.

In addition, in the present embodiment, the abutment portion 35 is formed over the entire range between the two resilient arm portions 33A in the connector width direction. That is to say, the abutment portion 35 is formed within a range corresponding to the entire extent of the stepped portion 12B of the locking arm portion 12 in the connector width direction, or more specifically, within a range comprising the entire extent of the stepped portion 12B. Therefore, forward movement of the mating detecting member 30 in the unmated state of the connectors can be reliably prevented because the surface area of the abutment between the abutment portion 35 and the stepped portion 12B is increased. In addition, since the abutment force is distributed in proportion to the magnitude of the surface area of the abutment, the load applied to the abutment portion 35 and the stepped portion 12B is reduced and damage to the abutment portion 35 and the stepped portion 12B can be adequately avoided.

As shown in FIGS. 6 (A) and 6 (B), when initiating the operation of mating connection of the connectors, the mating detecting member 30 of the connector 1 is positioned in the retracted position while the connector 1 is disposed such that the front end portion thereof faces the opening of the receiving portion 41 of the counterpart connector 2 from the rear. The connector 1 is then moved forward and introduced into the receiving portion 41.

Figure 8:
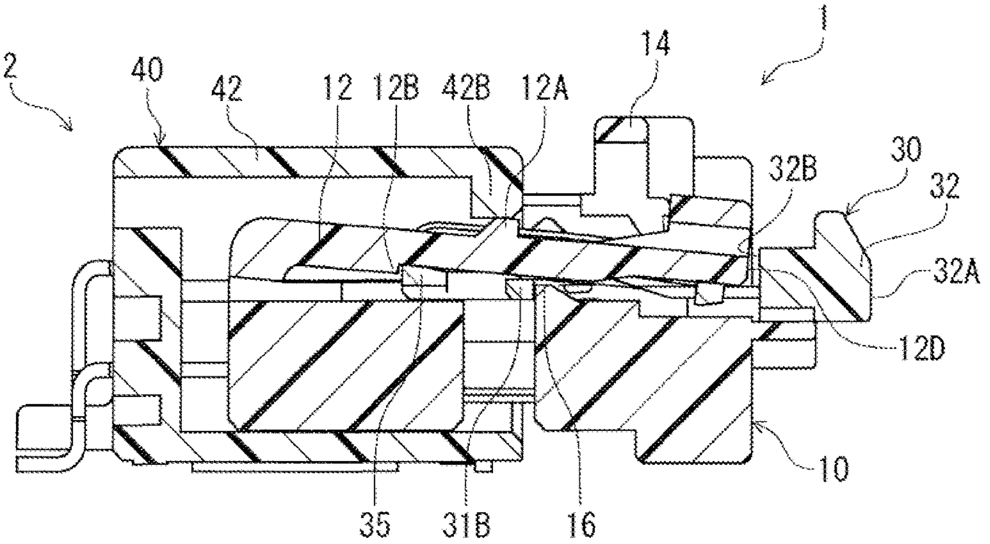
FIGS. 8 (A) and 8 (B) illustrates a longitudinal cross-sectional view of the electrical connector and the counterpart connector in a partially mated state of the connectors, wherein FIG. 8 (A) shows a cross section at the location of the locking portion, and FIG. 8 (B) shows a cross section at the location of a protrusion.
Figure 8:
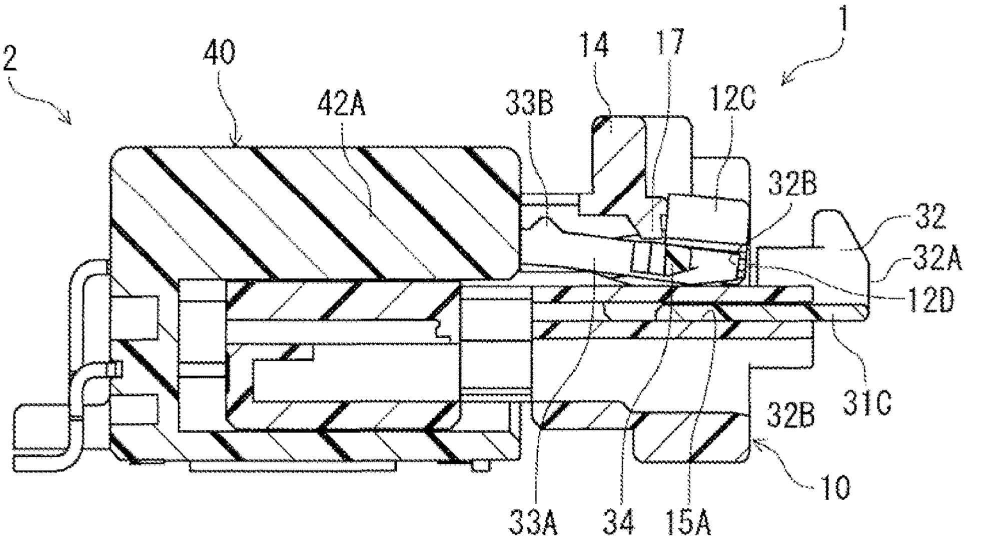

As shown in FIG. 8 (A), during connector mating, the locking portion 12A of the locking arm portion 12 abuts the lockable portion 42B of the counterpart housing 40 and is subject to a downwardly directed force exerted by the lockable portion 42B, thereby causing the locking arm portion 12 to be resiliently displaced downward. As shown in FIG. 8 (A), as a result of the resilient downward displacement of the locking arm portion 12, the rear end portion of the locking arm portion 12 is lowered to a location having a region of overlap with the bottom portion of the operating portion 32 in the vertical direction and positioned forwardly of said operating portion 32. Since at such time the pressure-applying portion 12C of the locking arm portion 12 pushes the rear end portions of the resilient arm portions 33A of the mating detecting member 30 downward, the resilient arm portions 33A are also resiliently displaced downward. As a result, as shown in FIG. 8 (B), the engaging portions 34 of the mating detecting member 30 are displaced below the engageable portions 17. Therefore, this allows for further forward movement of the connector 1.

As the connector 1 moves further forward and the locking portion 12A passes the location of the lockable portion 42B and reaches a location forward of the lockable portion 42B, as shown in FIG. 9 (A), the locking arm portion 12 returns to its free state. As a result, the locking portion 12A is positioned in a manner that permits locking engagement with the lockable portion 42B from the front, and the connectors become locked. At such time, as shown in FIG. 9 (B), the protrusions 33B of the mating detecting member 30 abut the projecting edge portion 42C of the counterpart housing 40 and are subject to a downwardly directed force exerted by the projecting edge portion 42C, thereby maintaining the state of resilient downward displacement of the resilient arm portions 33A. This means that even though the locking arm portion 12 returns to its free state, the resilient arm portions 33A remain in their resiliently displaced state, with the engaging portions 34 located downwardly of the engageable portions 17. In addition, at such time, the contact portions 51 of the counterpart terminals 50 enter the terminal accommodating portions 111 of the housing 110 from the front and make contact with the contact portions of the terminals 20, thereby being placed in a state that permits electrical communication therewith.

Next, the operating portion 32 of the mating detecting member 30 is pushed toward the front, in other words, a forwardly directed operating force is applied to the pressure-receiving portion 32A, thereby moving the mating detecting member 30 toward the advanced position. In view of the fact that, as described above, the engaging portions 34 are located downwardly of the engageable portions 17, the engaging portions 34 do not lockingly engage the engageable portions 17 and the mating detecting member 30 moves toward the front in an unimpeded manner. As shown in FIG. 10 (A), when the mating detecting member 30 moves to the advanced position, the front portion of the operating portion 32 is positioned directly below the rear end portion of the locking arm portion 12 such that said rear end portion can be supported from below. In addition, said operating portion 32 is itself supported by the supporting portion 15 of the housing 10 from below. Therefore, since the downward resilient displacement of the locking arm portion 12 is restricted by the operating portion 32, the state of engagement of the locking portion 12A and the lockable portion 42B is maintained and the locked state of the connectors is adequately ensured.

In addition, when the mating detecting member 30 moves toward the advanced position, the protrusions 33B pass the location of the projecting edge portion 42C and reach locations forward of the projecting edge portion 42C while, at the same time, the engaging portions 34 pass the locations of the engageable portions 17 and reach locations forward of the engageable portions 17, whereupon the resilient arm portions 33A return to their free state. As a result, as shown in FIG. 9 (B), the protrusions 33B are positioned in a manner that permits locking engagement with the projecting edge portion 42C from the front and, in addition, as shown in FIG. 9 (C), the engaging portions 34 are positioned in a manner that permits locking engagement with the engageable portions 17 from the front. Therefore, inadvertent rearwardly directed movement of the mating detecting member 30 is prevented. Based on the fact that the mating detecting member 30 has moved to the advanced position in this manner, it is detected that the connector 1 has been properly matingly connected to the counterpart connector 2, and the operation of mating connection of the connectors is complete.

If during the operation of connector mating, immediately prior to initiating the operation of forwardly pushing the mating detecting member 30 located in the retracted position, the connector 1 is not fully mated with the counterpart connector 2, i.e., in the event of a partially mated state, such as the one illustrated in FIGS. 8 (A) and 8 (B), merely pushing the mating detecting member 30 forward in the "as-is" state is needed, as will now be described.

As shown in FIGS. 8 (A) and 8 (B), in the present embodiment, in the partially mated state of the connectors, the locking arm portion 12 is displaced downward and the rear end portion thereof is positioned forwardly of the operating portion 32 in a state that permits abutment against said operating portion 32. Therefore, when the operation of pushing the operating portion 32 forward is performed in the "as-is" state, the front end face 32B of said operating portion 32 (see also FIG. 5 (A)) abuts the rear end face 12D of the locking arm portion 12 (see also FIG. 4) from the rear, and the forwardly directed operating force is transmitted via the operating portion 32 to the locking arm portion 12 and, in turn, to the housing 10. As a result, the housing 10 moves forward simultaneously with the forward movement of the mating detecting member 30. Therefore, just by performing a single operation of pushing the operating portion 32 of the mating detecting member 30 forward, the mating detecting member 30 can be moved to the advanced position while matingly connecting the housing 10 to the counterpart connector 2, and the work efficiency of the operation of mating connection of the connectors is improved.

It should be noted that pushing the mating detecting member 30 and the housing 10 simultaneously in the partially mated state of the connectors, as described above, is not essential and, needless to say, the housing 10 may be moved forward alone and mated with the counterpart connector 2 first, while the mating detecting member 30 may be moved forward thereafter.

When disengaging the connector 1 from the counterpart connector 2, first, the mating detecting member 30 may be pulled rearwardly to move it to the retracted position, and the connector 1 may be then pulled rearwardly to disengage it from the counterpart connector 2.

DESCRIPTION OF THE REFERENCE NUMERALS

1 Connector
2 Counterpart connector
10 Housing
12 Locking arm portion
12B Stepped portion
12D Rear end face
20 Terminals
30 Mating detecting member
32 Operating portion
32A Pressure-receiving portion
32B Front end face
33A Resilient arm portions
34 Engaging portions
35 Abutment portion

The invention claimed is:

1. An electrical connector matingly connected to a counterpart connector in a frontal manner, said connector having:

a housing, a plurality of terminals arranged side by side in the connector width direction and retained within the housing, and a mating detecting member which is retained in the housing in a state that permits movement relative to the housing in the forward-backward direction between an advanced position and a retracted position and is used to detect a state of being mated with a counterpart connector, wherein:

the housing has a locking arm portion, which extends in the forward-backward direction and is resiliently displaceable in the vertical direction, and which is lockingly engageable with a counterpart connector in the forward-backward direction;

the mating detecting member has an operating portion provided in the rear portion of the mating detecting member, resilient arm portions which extend in the forward-backward direction along the locking arm portion and are resiliently displaceable in the vertical direction, engaging portions protruding in the connector width direction from the rear portions of the resilient arm portions, and an abutment portion formed at the front end of the mating detecting member below the locking arm portion;

the operating portion, in the rear end portion, has a pressure-receiving portion intended for receiving pressing operations from the rear;

the engaging portions are provided at locations offset upwardly from the pressure-receiving portion and, when the mating detecting member is located in the retracted position, are positioned in a manner that permits locking engagement, from the rear, with sections of the housing other than the locking arm portion; and when pressure is applied from the rear to the pressure-receiving portion of the operating portion of the mating detecting member located in the retracted position, the location of locking engagement of the engaging portions and the housing is used as a fulcrum to displace the front end of the mating detecting member upward and abut said abutment portion against part of the locking arm portion from the rear.

2. The electrical connector according to claim 1, wherein part of the locking arm portion is formed as a stepped portion.

3. The electrical connector according to claim 1, wherein the locking arm portion is resiliently displaced downward as a result of abutment against the counterpart connector and the operating portion is placed in a state that permits abutment against the locking arm portion from the rear when the electrical connector is partially mated with the counterpart connector.

4. The electrical connector according to claim 3, wherein the operating portion is placed in a state that permits abutment, from the rear, against the rear end face of the resiliently downwardly displaced locking arm portion with the front end face of the operating portion.

5. The electrical connector according to claim 2, wherein the stepped portion is formed over the entire extent of the locking arm portion in the connector width direction, and the abutment portion is formed within a range corresponding to the entire extent of the locking arm portion in the connector width direction.

* * * * *